(12) United States Patent
Cook (10) Patent No.: US 12,257,740 B2
(45) Date of Patent: Mar. 25, 2025

(54) SYSTEMS FOR BULK BLENDING OF CEMENT POWDERS

(71) Applicant: Adaptive Industrial, Inc., Mount Pleasant, NC (US)

(72) Inventor: Roger Derek Cook, Mount Pleasant, NC (US)

(73) Assignee: Adaptive Industrial, Inc., Mount Pleasant, NC (US)

( * ) Notice: Subject to any disclaimer, the term of this patent is extended or adjusted under 35 U.S.C. 154(b) by 1170 days.

(21) Appl. No.: 16/985,472

(22) Filed: Aug. 5, 2020

(65) Prior Publication Data

US 2021/0039278 A1    Feb. 11, 2021

Related U.S. Application Data

(60) Provisional application No. 62/883,142, filed on Aug. 6, 2019.

(51) Int. Cl.
*B28C 9/02* (2006.01)
*B01F 35/30* (2022.01)
(Continued)

(52) U.S. Cl.
CPC .............. *B28C 9/02* (2013.01); *B28C 5/0818* (2013.01); *B28C 5/4262* (2013.01);
(Continued)

(58) Field of Classification Search
CPC ....... B28C 5/06; B28C 5/0875; B28C 7/0418; B28C 7/163; B28C 5/1215; B28C 7/0413; B28C 5/0893; B28C 5/1238; B28C 5/16; B28C 7/02; B28C 5/08; B28C 5/0806; B28C 5/1253; B28C 9/0454;
(Continued)

(56) References Cited

U.S. PATENT DOCUMENTS

| 894,174 A | * | 7/1908 | Smith | ..................... B01F 23/41 |
| | | | | 366/175.3 |
| 2,277,518 A | * | 3/1942 | Jaeger | ................... B28C 5/4262 |
| | | | | 366/54 |

(Continued)

FOREIGN PATENT DOCUMENTS

WO    WO-9315890 A1 *  8/1993 ........... B28C 9/0454

*Primary Examiner* — Charles Cooley
(74) *Attorney, Agent, or Firm* — Clements Bernard Walker; Christopher L. Bernard; Devin Cummins (57) ABSTRACT

A bulk storage plant for providing cement mixtures oil well construction is disclosed. The bulk storage plant includes bulk storage sources, an additive station, a weigh batcher, and a tumble blender. The bulk storage sources are adapted to contain cement ingredients. The additive station is adapted to provide an additive for adjusting cement properties. The weigh batcher is connected to the bulk storage silos and the additive station. The weigh batcher is adapted to receive the cement ingredients from the bulk storage sources and the additive from the additive station. The tumble blender is connected to the weigh batcher and is adapted to receive the cement ingredients and the additive from the weigh batcher. The tumble blender is adapted to blend the ingredients and provide the blended ingredients to one of a temporary storage silo and a storage vessel for transport to the oil well site.

17 Claims, 8 Drawing Sheets

(51) Int. Cl.
*B28C 5/08* (2006.01)
*B28C 5/42* (2006.01)
*B28C 7/04* (2006.01)
*B28C 9/00* (2006.01)
*E21B 33/14* (2006.01)

(52) U.S. Cl.
CPC ............ *B28C 7/0436* (2013.01); *B28C 9/004* (2013.01); *B01F 2035/351* (2022.01); *E21B 33/14* (2013.01)

(58) Field of Classification Search
CPC ..... B28C 5/0818; B28C 9/006; B28C 9/0481; B28C 5/146; B28C 7/06; B28C 9/0409; B28C 9/0427; B28C 9/049; B28C 9/02; B28C 7/0436; B28C 9/004; B28C 7/0481; B28C 1/22; B28C 1/225; B28C 5/4262; E04G 21/025; E04G 21/0436; E04G 21/10; B01F 5/0473; B01F 5/048; B01F 5/0611; B01F 5/0618; B01F 2005/0091; B01F 2005/0636; B01F 25/3141; B01F 25/31423; B01F 25/4311; B01F 25/4316; B01F 25/431971; B01F 2025/931; B01F 35/2202; B01F 23/53; B01F 2035/99; B01F 35/00; B01F 35/20; B01F 35/2111; B01F 2035/351; B28B 1/16; C04B 2111/00146; C04B 40/0028; E04F 21/24; E04F 15/12; E04F 21/08; E04F 21/248; E04F 21/02; B29C 67/242; Y02W 30/91; E21B 33/14; C09K 8/467
USPC ............. 366/11, 66, 12, 18, 68, 183.4, 139, 366/197–201, 192, 193
See application file for complete search history.

(56) References Cited

U.S. PATENT DOCUMENTS

| | | | | |
|---|---|---|---|---|
| 2,476,023 | A * | 7/1949 | Bohannan | B28C 5/4262 285/94 |
| 3,224,741 | A * | 12/1965 | Muench, Sr. | B01F 29/32 366/241 |
| 3,888,468 | A * | 6/1975 | Albin | B28C 5/1843 366/14 |
| 4,792,234 | A * | 12/1988 | Doherty | B28C 9/0454 366/14 |
| 5,054,933 | A * | 10/1991 | Derksen | B01F 27/808 366/138 |
| 5,411,329 | A * | 5/1995 | Perry | B28C 9/0409 366/26 |
| 5,474,379 | A * | 12/1995 | Perry | B28C 5/4265 366/26 |
| 5,605,397 | A * | 2/1997 | Oberg | B28C 5/386 366/14 |
| 5,667,298 | A * | 9/1997 | Musil | B28C 5/2018 366/18 |
| 5,730,523 | A * | 3/1998 | Flood | B28C 7/0445 366/18 |
| 2008/0273415 | A1* | 11/2008 | Thornton | B28C 9/002 366/8 |
| 2008/0310247 | A1* | 12/2008 | Basaraba | B28C 7/0481 366/8 |
| 2009/0177313 | A1* | 7/2009 | Heller | B28C 9/049 700/214 |
| 2009/0316520 | A1* | 12/2009 | Barger | B01F 27/1121 366/140 |
| 2012/0230147 | A1* | 9/2012 | Heller | B01F 27/091 366/141 |
| 2014/0355372 | A1* | 12/2014 | Black | B01F 35/881 366/8 |
| 2021/0039278 | A1* | 2/2021 | Cook | B28C 9/004 |
| 2021/0229322 | A1* | 7/2021 | Johnson | B28C 9/0409 |
| 2022/0297346 | A1* | 9/2022 | Johnson | B28C 5/0818 |

* cited by examiner

SYSTEMS FOR BULK BLENDING OF CEMENT POWDERS

PRIORITY CLAIM

This application claims the benefit of U.S. Provisional Patent Application Ser. No. 62/883,142 entitled "IMPROVED SYSTEMS FOR BULK BLENDING OF CEMENT POWDERS," filed on Aug. 6, 2019, which is hereby incorporated by reference.

FIELD OF THE DISCLOSURE

The present disclosure generally relates to bulk blending of cement powders. More particularly, the present disclosure relates to systems and methods for bulk blending cement powders using a tumble blender system.

BACKGROUND OF THE DISCLOSURE

In oilfield drilling, cement is used to stabilize and seal the metal casing pipe that runs to the bottom of the wellbore. In the drilling stage, cement is used to stabilize the metal casing pipe that runs to the bottom of the wellbore. The cement blend is mixed at the well site with water and other required liquid additives to form a liquid slurry and pumped down the inside of the casing. As the slurry reaches the bottom of the casing, it exits and begins flowing back toward the surface in the annular space between the exterior of the casing and the earthen wall of the wellbore (the "annulus"). Pumping continues until the cement slurry reaches the surface. The purpose of cement in the drilling stage is to stabilize the casing laterally in the wellbore, to seal and stabilize the individual pieces of the casing at their points of connection, and to prevent the uncontrolled migration of hydrocarbons up the wellbore through the annulus.

Cement may also be used to temporarily plug the well during the drilling stage. In this instance cement slurry is pumped down the inside of the casing to the bottom of the well and allowed to harden. The purpose is to prevent the flow of hydrocarbons up the interior of the casing until further construction, stimulation, or well completion can occur.

At the end of a well's production life cement is used to plug the wellbore to prevent further migration of hydrocarbons and fill the void created in the drilling process.

Failures in the cementing process can be dangerous or costly. If the annulus is not sealed correctly, hydrocarbons such as oil or natural gas may move from the oil producing region of the strata to areas where groundwater contamination may occur. It is possible for casing strings to be violently ejected from the wellbore if the cement does not stabilize the pipe appropriately.

Failures in the cementing process can have catastrophic results, including necessary abandonment of the well, diminished well productivity costly remediation to repair or obsolete the well, environmental damage, and injury to or death of personnel. For instance, in the Deepwater Horizon explosion, a temporary cement plug in the well failed and set off a chain of events that resulted in the death of rig workers and an ecological disaster.

In view of this, a cement blend and slurry for forming the cement is designed for each well based on well characteristics: geological formations at the drill site, planned well depth, temperature and pressure at various regions of the well, and expected function of the cement blend. The major and minor materials for the cement blends are stored at a blending facility or "bulk plant" that serves drilling rigs in a general location. The bulk plant operators receive a work order based on a blend design that includes the amount of each required material. The operators weigh out the required amount of material, blend the materials together, and load the powder blends into trucks or containers for shipping to the well site where they will be mixed with liquids to create a slurry.

The primary ingredient in the powder blends is Portland Cement. Other materials are added to control different characteristics of the blend, such as how quickly the slurry will harden at the high temperatures at the bottom of the well, to increase strength, decrease density, or prevent the slurry from leaking into the surrounding formations. As some components of the blend constitute a small portion of the total product, effective blending of the materials is critical to achieve an acceptable final product.

Figure 1:
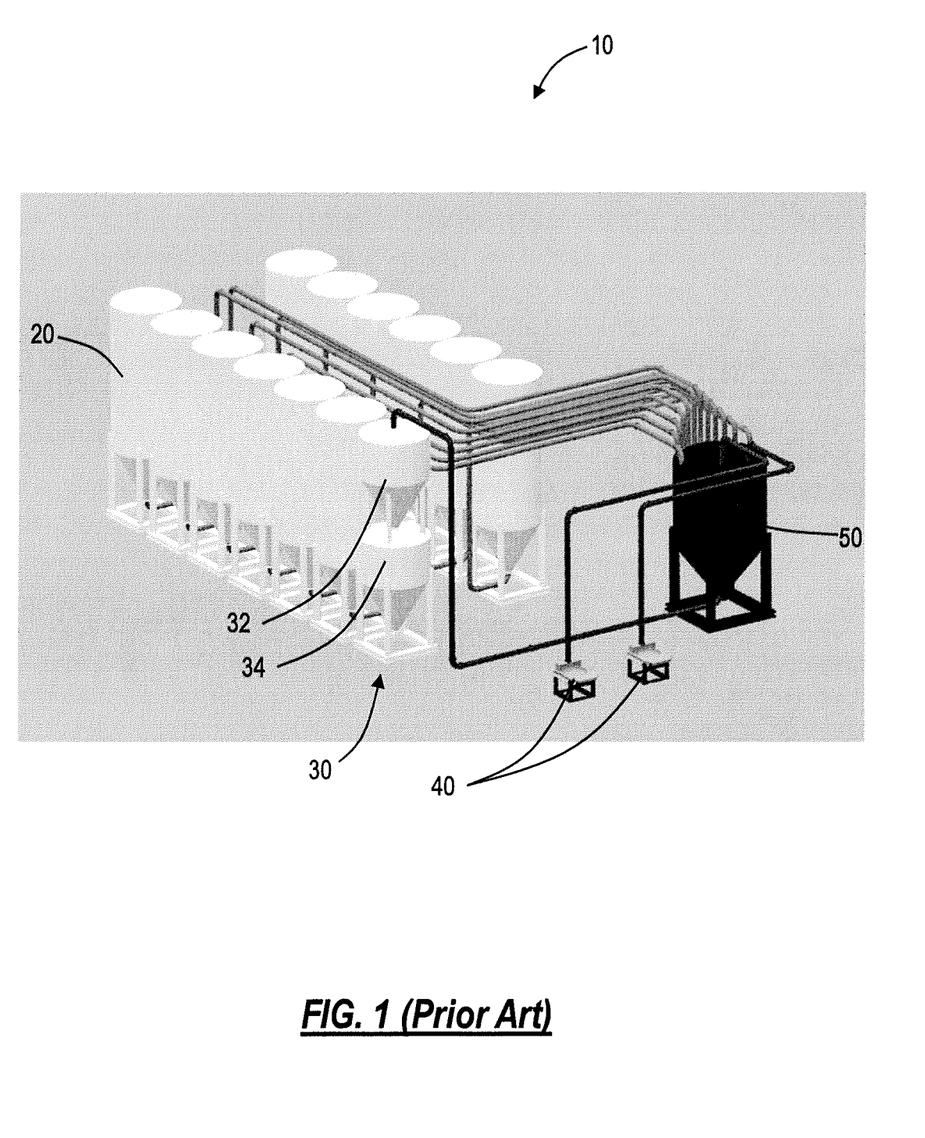
FIG. 1 is a perspective schematic of a current blending system for blending the powder for use at an oilfield.

FIG. 1 is a perspective schematic of a bulk plant 10 for blending the powder for use at an oilfield. The process involves storing materials in storage silos 20, adding the required materials in layers ("sandwiching") to a weigh batcher 50 from the storage silos 20, adding any additives needed to the weigh batcher 50 from additive stations 40, and then pneumatically conveying the materials from the weigh batcher 50 to a pneumatic blender 30, such as a "double-stack". The double-stack includes two sections 32 and 34 with a funnel shape at the bottom of each section. A butterfly valve is positioned between the two sections 32 and 34 and an external pipe connects the top section 32 to the bottom section 34. After all of the material for the blend is transferred to one section 32, 34 of the double-stack, the material is transferred to the other section 32, 34 of the double-stack. A transfer of the material between sections 32, 34 of the double-stack is commonly referred to as a "move." While the sections 32, 43 are shown stacked, in some instances the sections 32, 34 are positioned side by side. The operator subjects the materials to a prescribed number of moves to mix and blend the materials.

As new oil exploration technologies have become available, the cement blends have become increasingly technical. This is in part due to the varying properties needed in the cement for the wells. In particular, the temperatures and pressures of the well vary with the depth, with the deeper sections of the well operating at higher temperatures as pressures. These changes in temperature and pressure affect the cure time of the cement slurry, and thus, require specific combinations of materials and additives to ensure proper cure times. Furthermore, hydraulic fracturing utilizes explosive charges in the production zones to perforate the casing and cement so that hydrocarbons can flow into the casing, which also places specific requirements on the properties of the cement. These factors and others create an increased demand for consistently blended cement mixtures to ensure a consistent cement structure is formed. Failure of the cement can result in delays and unnecessary costs in the drilling process.

In the double-stack, pneumatic blenders 30, the consistency of a blend may vary if the sandwiching technique varies in the weigh batcher 50, the pressures used for the conveyance between locations vary, a portion of the material is left in a tank inadvertently during a move, or the prescribed number of moves between the sections 32 and 34 is not reached or exceeded.

As alternatives to the traditional pneumatic blender, plants have been built that use mechanical ribbon or paddle blenders such as those used in the cement industry. However, drive shafts, paddles, ribbons, etc. are exposed to the powder being blended, resulting in the potential for incomplete mix discharge which can result in the contamination of proximate batches. The bearings and seals associated with the shafts introduce contamination into the mix, such as grease or bearing materials. Further, the mix can contaminate the grease, resulting in damage to the bearings, seals, and shafts. The hardware that retains these exposed assemblies can become loose and contaminate the mix, and later interfere with the slurry pumps at the well site. The nature of ribbon mixers results in numerous locations where dust can escape during material transfer to the mixer, which results in health and environmental concerns. As the ribbons or paddles wear on these mixers, the quality of the blends will necessarily degrade.

Therefore, there remains a need for a new bulk blending system that produces reliable cement blends and withstands the scrutiny of interested parties.

BRIEF SUMMARY OF THE DISCLOSURE

In one exemplary embodiment, a bulk storage plant for providing cement mixtures to an oil well site includes a plurality of bulk storage sources, at least one additive station, a weigh batcher, and at least one tumble blender. The plurality of bulk storage sources is adapted to contain cement ingredients. The at least one additive station is adapted to provide an additive for adjusting cement properties. The weigh batcher is connected to the plurality of bulk storage silos and the at least one additive station. The weigh batcher is adapted to receive the cement ingredients from the plurality of bulk storage sources and the additive from the additive station. The at least one tumble blender is connected to the weigh batcher and is adapted to receive the one or more cement ingredients and the cement additive from the weigh batcher. The at least one tumble blender is adapted to blend the ingredients and provide the blended ingredients to one of a temporary storage silo and a storage vessel for transport to an oil well site.

In embodiments, the at least one tumble blender is a slant cone blender. In embodiments, the at least one tumble blender is adapted to pneumatically receive and discharge the cement ingredients.

In embodiments, the bulk storage plant further includes one or more couplers adapted to temporarily couple the at least one tumble blender to conduits during ingress and egress of the cement ingredients, wherein the one or more couplers are adapted to form a seal with the at least one tumble blender during the ingress and the egress of the cement ingredients.

In embodiments, the bulk storage plant further includes a pneumatic source that is adapted to provide one of a positive pressure and a negative pressure to transport the cement ingredients between one or more of the plurality of bulk storage sources and the weigh batcher, the at least one additive station and the weigh batcher, the weigh batcher and the tumble blender, and out of the tumble blender.

In embodiments, the egress of materials from the tumble blender is performed by one of pneumatics, mechanical conveyance, and gravitational discharge.

In another exemplary embodiment, an oil well system includes an cement slurry mixer and pump and a bulk storage plant. The bulk storage plant includes a plurality of bulk storage sources, at least one additive station, a weigh batcher, and at least one tumble blender. The plurality of bulk storage sources is adapted to contain cement ingredients. The at least one additive station is adapted to provide an additive for adjusting cement properties. The weigh batcher is connected to the plurality of bulk storage silos and the at least one additive station. The weigh batcher is adapted to receive the cement ingredients from the plurality of bulk storage sources and the additive from the additive station. The at least one tumble blender is connected to the weigh batcher and is adapted to receive the one or more cement ingredients and the cement additive from the weigh batcher. The at least one tumble blender is adapted to blend the ingredients and provide the blended ingredients to one of a temporary storage silo and a storage vessel for transport to an well site.

In embodiments, the oil well system further includes a storage vessel adapted to transfer the cement ingredients blended by the tumble blender from the tumble blender to a well bore of the cement slurry mixer and pump.

In embodiments, the oil well system further includes one or more temporary storage vessels adapted to temporarily store the cement ingredients blended by the tumble blender and to provide the cement ingredients to a well bore of the cement slurry mixer and pump.

In embodiments, the at least one tumble blender is a slant cone blender. In embodiments, the at least one tumble blender is adapted to pneumatically receive and discharge the cement ingredients. In embodiments, the egress of materials from the tumble blender is performed by one of pneumatics, mechanical conveyance, and gravitational discharge.

In embodiments, the bulk storage plant further includes one or more couplers adapted to temporarily couple the at least one tumble blender to conduits during ingress and egress of the cement ingredients, wherein the one or more couplers are adapted to form a seal with the at least one tumble blender during the ingress and the egress of the cement ingredients.

In embodiments, the bulk storage plant further includes a pneumatic source that is adapted to provide one of a positive pressure and a negative pressure to transport the cement ingredients between one or more of the plurality of bulk storage sources and the weigh batcher, the at least one additive station and the weigh batcher, the weigh batcher and the tumble blender, and out of the tumble blender.

In a further exemplary embodiment, a method for converting an existing oilfield bulk plant is disclosed. The method includes installing a tumble blender at the oilfield bulk plant. The method also includes re-routing conduits from each of the bulk storage silos to the tumble blender. The method further includes adding a coupler to an end of the conduits, the coupler adapted to temporarily connect to and form a seal with the tumble blender during ingress of materials.

In embodiments, the method yet further includes re-routing conduits from one or more additive stations, where adding the coupler further includes adding the coupler to an end of the conduits for the additive stations.

In embodiments, the method further includes converting a pneumatic blender into a temporary storage silo, and re-routing conduits from the temporary storage silo to the tumble blender. Optionally, adding a coupler to an end of the re-routed conduits of the temporary storage silo, the coupler adapted to temporarily connect to and form a seal with the tumble blender during egress of the materials. Optionally, a single coupler is used to couple all of the conduits for ingress and egress of the materials to and from the tumble blender.

In embodiments, the method further includes re-routing conduits for connecting to the storage vessel to the tumble blender and adding a coupler to an end of the re-routed conduits, the coupler adapted to temporarily connect to and form a seal with the tumble blender during egress of materials.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods for oilfield cement blending. In particular, the present disclosure relates to the use of one or more tumble blenders for blending the cement ingredients obtained from bulk storage silos and additive stations and providing those blended ingredients to an oil well site for use with an oil well. As noted above, improperly blended cement mixtures can result in cement that does not properly seal the oil well, secure the shaft via the cement in the annulus, and the like. Cement with the wrong properties can result in costly damage and injury to those working on the oil well.

Tumble blenders are available with no moving internal parts or obstructions (such as fins or paddles), which can reduce the risk of cement blends being contaminated by residual product, detached mechanical items such as bolts, or grease from bearings. Further, the ability to pressurize the tumble blender provides the ability to incorporate mechanical blending into the existing pneumatic plants without the need for expensive reconfiguration of the plants and reduces dust emissions compared to other mechanical blenders.

Further, one or more couplers can be provided to temporarily couple and seal the conduits to the tumble blender during ingress and egress of materials, which can further reduce dust emissions, spills, and the like.

Figure 2:
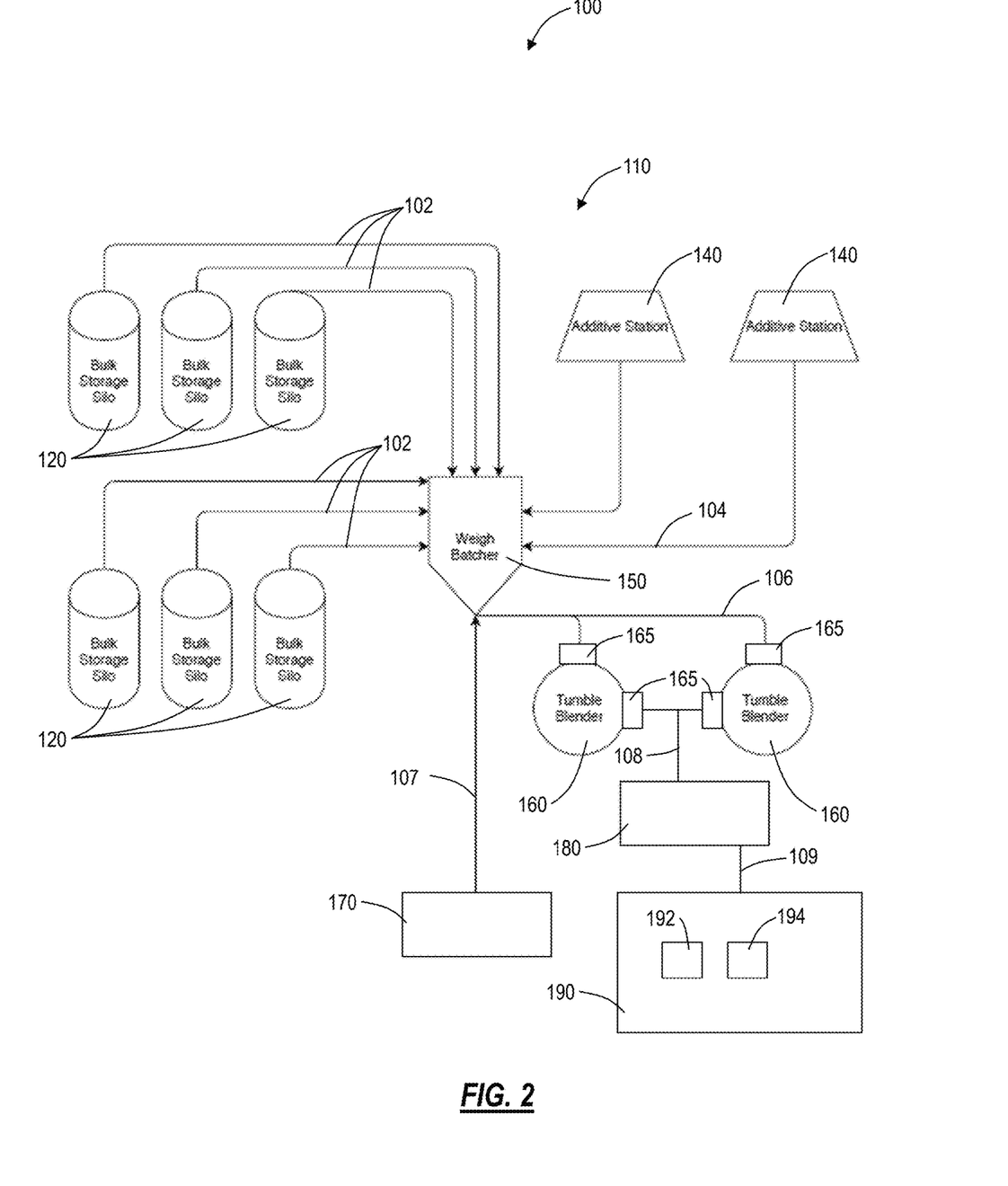
FIG. 2 is a schematic of an oil well cementing system.

FIG. 2 is a schematic of an oil well cementing system 100. Referring to FIG. 2, the oil well cementing system 100 includes an oil well site 190 with a cement slurry mixer 192 and pump 194, an oilfield bulk plant 110, and a storage vessel 180. The oilfield bulk plant 110 provides the oil well site 190 with blended cement/slurry for cement applications for an oil well of the oil well site 190. In some embodiments, the oil well site 190 is located remote from the oilfield bulk plant 110. In these embodiments, a storage vessel 180 is used to store and transport the blended cement to the oil well site 190. Alternatively, the oilfield bulk plant 110 delivers the blended cement directly to the oil well site 190. Temporary or permanent connections between the storage vessel 180, the oil well site 190, and the oilfield bulk plant are formed using conduits 108, 109, such as pipes, to transfer the blended cement therebetween.

In the embodiment illustrated in FIG. 2, the oilfield bulk plant 110 includes bulk storage silos 120, one or more additive stations 140, a weigh batcher 150, and one or more tumble blenders 160. Each of the of bulk storage silos 120 is adapted to contain and store powder ingredients. Different ingredients can be stored separately in different bulk storage silos 120. These ingredients include various powders and dry ingredients for the cement including various classes of Portland Cement, pozzolans, barite, sand, and the like.

The one or more additive stations 140 are adapted to provide other materials for adjusting blend properties. These additives include one or more of an accelerator, retarder, extender, density modifying agent, fluid loss additive, lost circulation additive, expansion additive, dispersant, antifoam agent, and the like. Such additives include shredded cellophane, ow-temperature coke, such as Coalite, silica flour, silica fume, bentonite, gel, salt, sugar, calcium chloride, and the like. The additives typically represent a minor amount of the blend ingredients. In embodiments, the smaller quantity ingredients are one of hand weighed and loaded into the additive stations 140 and weighed using an automated system.

The weigh batcher 150 is adapted to receive the various powders and dry ingredients from the bulk storage silos 120 and from the one or more additive stations 140. In the embodiment illustrated, conduits 102, 104, such as pipes and conveyors, connect the weigh batcher 150 to the bulk storage silos 120 and the one or more additive stations 140. In the embodiment illustrated, a pneumatic source 170 provides positive or negative pressure (depending on the orientation of the pneumatic source 170) to pneumatically move the materials to the weigh batcher 150. Alternatively, mechanical conveyors, gravity, and other methods can be used to convey the materials to the weigh batcher 150.

The one or more tumble blenders 160, such as diffusion mixers are adapted to receive the ingredients (powders, dry ingredients, and additives) from the weigh batcher 150. In the embodiment illustrated, conduits 106, such as pipes and conveyors, connect the tumble blenders 160 to the weigh batcher 150. In the embodiment illustrated, a pneumatic source 170 provides positive or negative pressure (depending on the orientation of the pneumatic source 170) to pneumatically move the materials to the tumble blenders 160 from the weigh batcher 150. Alternatively, mechanical conveyors, gravity, and other methods can be used to convey the materials to the tumble blenders 160.

Conveyance of the materials to the weigh batcher 150 and to the tumble blenders 160, and the subsequent blending process may be activated manually through human interaction with the system or automatically with the use of a computer control system. In order to precisely measure the various ingredients, one or more measuring devices is used to apportion the appropriate amount of material to the weigh batcher. The measuring devices may be flowmetric, gravimetric, volumetric, and the like.

In embodiments, each tumble blender 160 is one of a slant cone blender, a V-blender, and a double cone blender. In particular, each tumble blender 160 is a machine that blends powder and granular materials inside an enclosed vessel by rotating the vessel and 'tumbling' the ingredients.

In embodiments, each tumble blender 160 is connected to the conduits 106 via a coupler 165 for material infeed either automatically or manually. The coupler 165 may include a pipe, tube, or collar that extends to temporarily connect to the tumble blender 160 during material infeed. The coupler 165 allows material to pass into the tumble blender 160 by one of pneumatics, mechanical conveyance, gravity, and the like. The coupler 165 is adapted to form a seal with the tumble blender 160 to prevent dust escaping or material spillage. Upon receipt of the materials for mixing, the coupler 165 decouples the connections and the tumble blender 160 is sealed for the mixing process.

Similarly, couplers 165 may connect each tumble blender 160 to a storage vessel 180. The coupler 165 may include a pipe, tube, or collar that extends to temporarily connect to the tumble blender 160 to the storage vessel 180 during material outfeed. The coupler 165 allows material to pass out of the tumble blender 160 by one of pneumatics, mechanical conveyance, gravity, and the like.

While multiple couplers 165 are shown for ingress/egress of the materials, in some embodiments, a single coupler 165 is used for each tumble blender 160, where each of the ingress/egress conduits are connected thereto. Valves, such as check valves and butterfly valves can be used to control the flow of materials into and out of the tumbler blenders 160.

Figure 3:
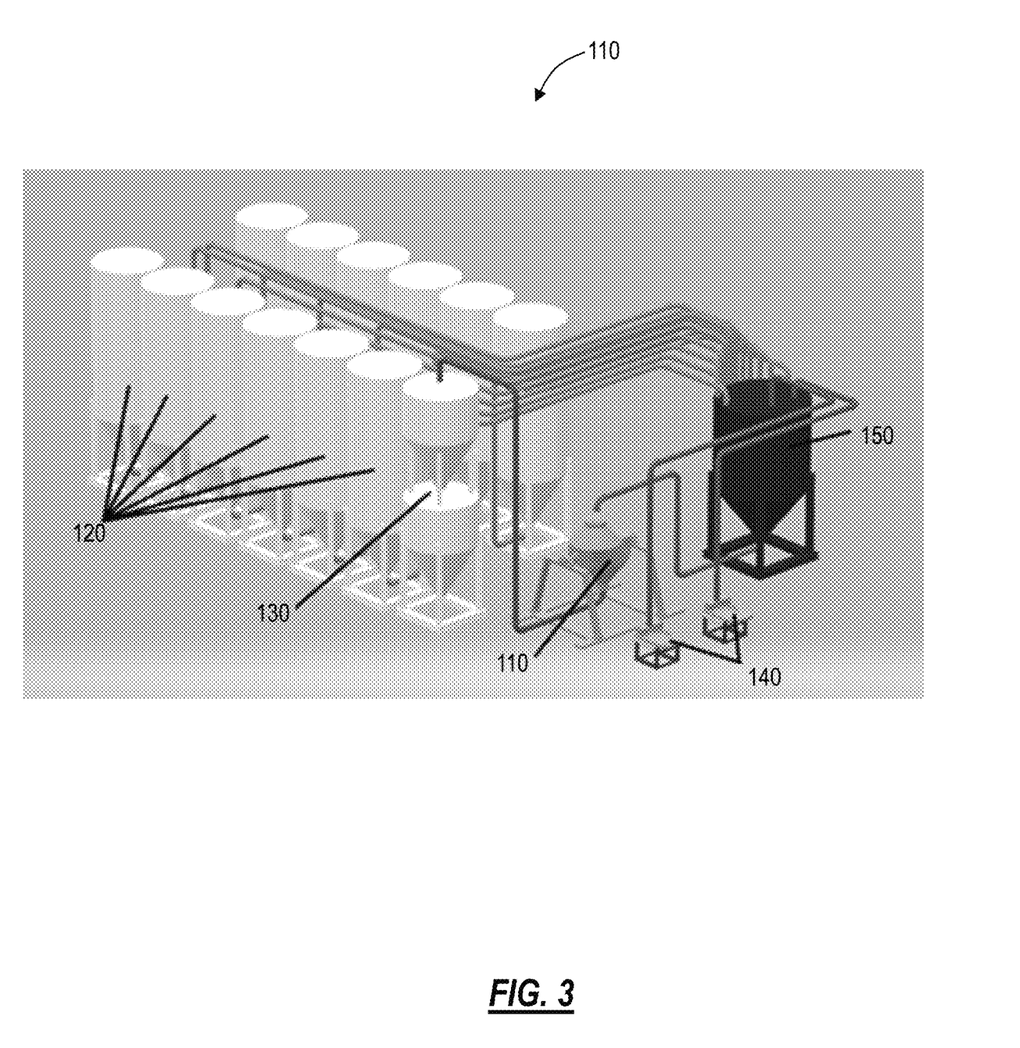
FIG. 3 is a perspective schematic of an embodiment of the oilfield bulk plant of FIG. 2.

FIG. 3 is a perspective schematic of an embodiment of the oilfield bulk plant 110 of FIG. 2. In the embodiment of FIG. 3, an existing oilfield bulk plant 10, such as the one illustrated in FIG. 1, is converted into an oilfield bulk plant 110. In particular, one or more tumble blenders 160 is added therein. Similar to oilfield bulk plant 110, the materials are conveyed to the weigh batcher 150 via conduits 102, 104, and then conveyed to the tumble blenders 160 via conduits 106. Again, couplers 165 may be used to couple the conduits 106 to the tumble blenders 160.

In the embodiment illustrated, temporary storage silos 130 are used to store the mixture after the tumble blenders 160 complete the blending process. Similar to the connection to the storage vessel 180, a coupler 165 (which is the same or separate from the coupler 165 for ingress) is used to make an egress connection to allow the mixture to be moved to the temporary storage silos 130 via conduits 103. The conduits 103, such as pipes and conveyors, connect the tumble blenders 160 to the temporary storage silos 130. In embodiments, a pneumatic source provides positive or negative pressure (depending on the orientation of the pneumatic source 170) to pneumatically move the materials to the temporary storage silos 130. Alternatively, mechanical conveyors, gravity, and other methods can be used to convey the materials to the temporary storage silos 130. In the embodiment illustrated, the temporary storage silos 130 are sections of the double stack pneumatic blender converted for storage.

The temporary storage silos 130 include a conduit for direct connection to the oil well site 190 or for a temporary connection to the storage vessel 180, such as a truck.

Figure 4:
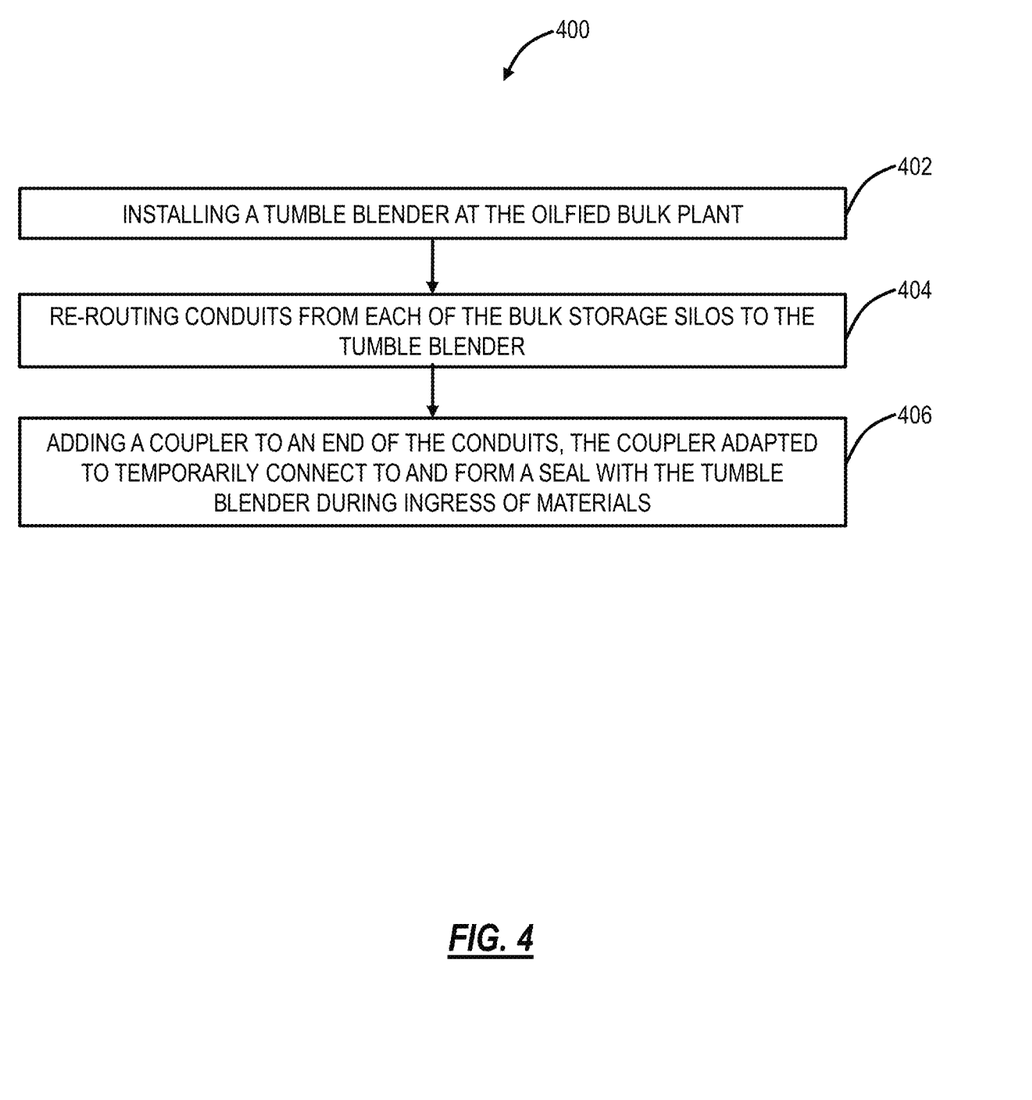
FIG. 4 is a flowchart of a method for retrofitting an oilfield bulk plant.

FIG. 4 is a flowchart of a method 400 for converting an existing oilfield bulk plant 110. The method 400 includes installing a tumble blender 160 at the oilfield bulk plant at step 402. The method further includes re-routing conduits from each of the bulk storage silos 120 to the tumble blender 150 at step 404. The method further includes adding a coupler 165 to an end of the conduits, the coupler adapted to temporarily connect to and form a seal with the tumble blender 160 during ingress of materials at step 406.

In some embodiments, step 404 further includes re-routing conduits from one or more additive stations 140, and step 406 further includes adding the coupler 165 to an end of the conduits for the additive stations 140.

In embodiments, the method 400 also includes converting a pneumatic blender into a temporary storage silo and re-routing conduits from the temporary storage silo to the tumble blender 160. In some of these embodiments, the method includes adding a coupler 165 to an end of the re-routed conduits, the coupler 165 adapted to temporarily connect to and form a seal with the tumble blender 160 during egress of materials. In some embodiments, a single coupler 165 is added that couples all of the ingress and egress conduits to the tumble blender 160.

In embodiments, the method 400 includes re-routing conduits for connecting to the storage vessel 180 to the tumble blender 160 and adding a coupler 165 to an end of the re-routed conduits, the coupler 165 adapted to temporarily connect to and form a seal with the tumble blender 160 during egress of materials. In some embodiments, a single coupler 165 is added that couples all of the ingress and egress conduits to the tumble blender 160.

Figure 5:
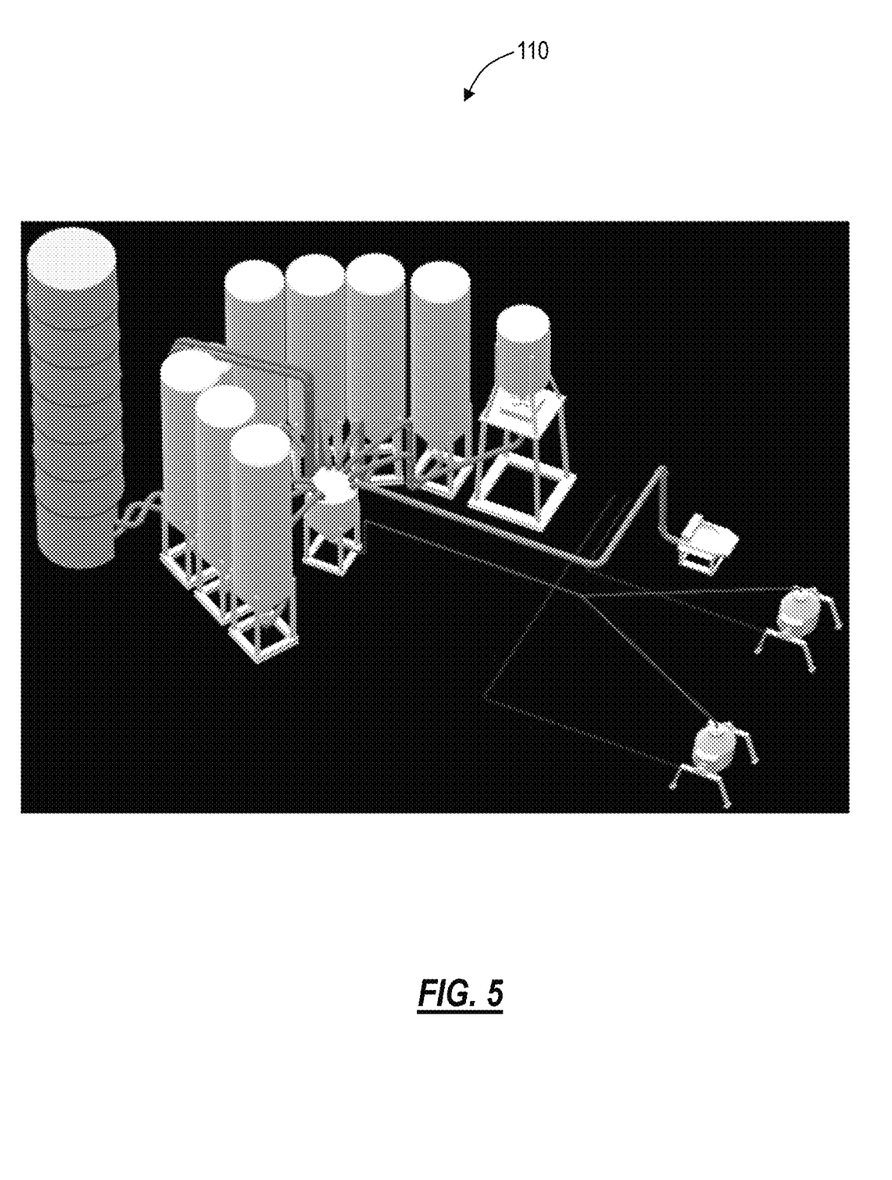
FIG. 5 is a perspective schematic of another embodiment of an oilfield bulk plant of FIG. 2.
Figure 6:
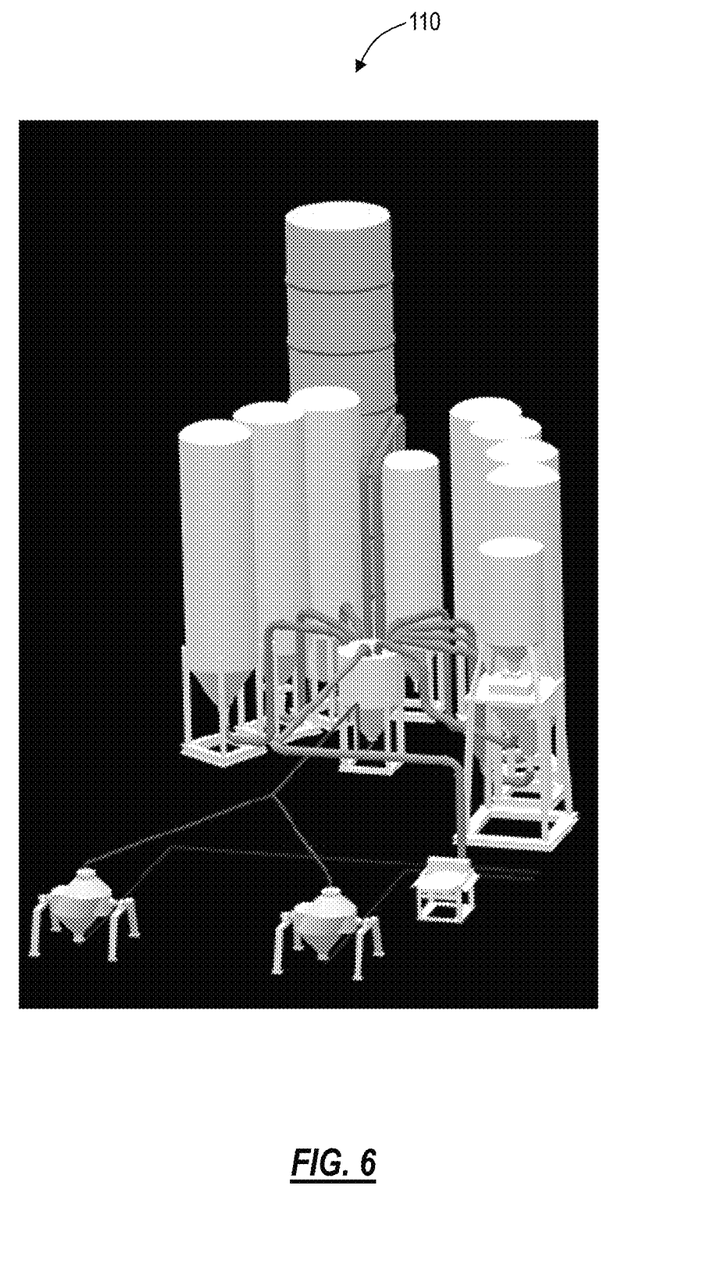
FIG. 6 is an alternative perspective schematic of the oilfield bulk plant of FIG. 5.

FIGS. 5-8 describe further embodiments and steps for the method 400. FIG. 5 is a perspective schematic of another embodiment of an oilfield bulk plant 110 of FIG. 2. FIG. 6 is an alternative perspective schematic of the oilfield bulk plant 110 of FIG. 5. Referring to FIGS. 5 and 6, conversion of an existing ribbon blender bulk plant to a dual tumble blender facility will entail removal of all screw conveyors, International Standards Organization ("ISO") shipping containers, dilute phase conveyors, and the ribbon mixer. A building sized to house the pressure and vacuum compressors, tumble blenders 160, additive station 140, and additives will need to be constructed, if not already available. A weigh batcher 160, such as a pneumatic weigh batcher, will be installed in the area of the existing bulk storage silos 120, and the bulk storage silos 120 are piped to the weigh batcher 150 for dense phase pneumatic conveying. A typical pneumatically conveyed additive station 140 is installed in the building and piped for pneumatic conveying to the weigh batcher 150.

As described above, at the beginning of the cycle, a vacuum is drawn on the weigh batcher 150. The first layer of bulk materials required from the bulk storage silos 120 is drawn to the weigh batcher 150. The additives are then conveyed to the weigh batcher 150, and then the remainder of the bulk materials required from the bulk storage silos 120 are drawn to the weigh batcher 150. The contents of the weigh batcher 150 are then pneumatically conveyed to one of the tumble blenders 160. As the blending process begins, the weigh batcher 160 can begin charging with materials for the next job. When the mechanical blending time is complete, the contents of the tumble blender 160 are pneumatically conveyed to storage vessel, such as a truck, or holding tank, such as a temporary storage silo 130. As the material is being discharged from one tumble blender 160, the other tumble blender 160 is available to receive material from the weigh batcher 150. The dual tumble blender configuration offers redundancy to reduce plant downtime in the event that maintenance is required on one of the tumble blenders 160.

Figure 7:
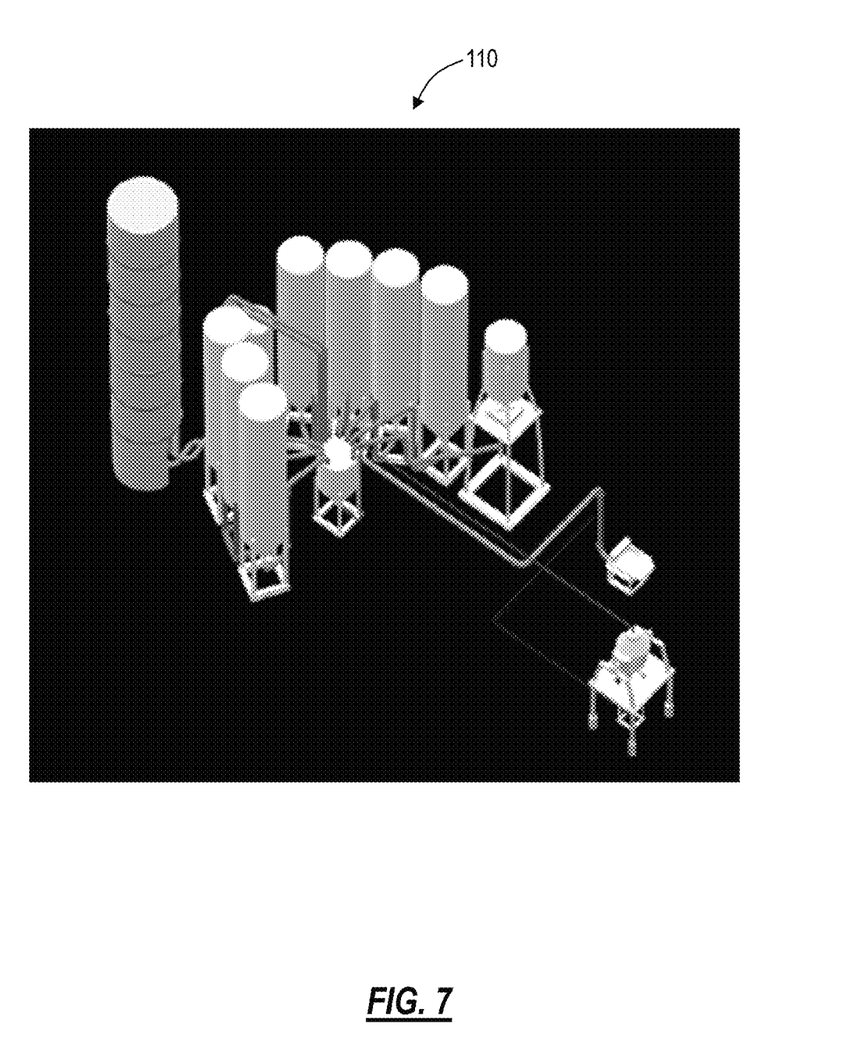
FIG. 7 is a perspective schematic of a further embodiment of an oilfield bulk plant of FIG. 2.
Figure 8:
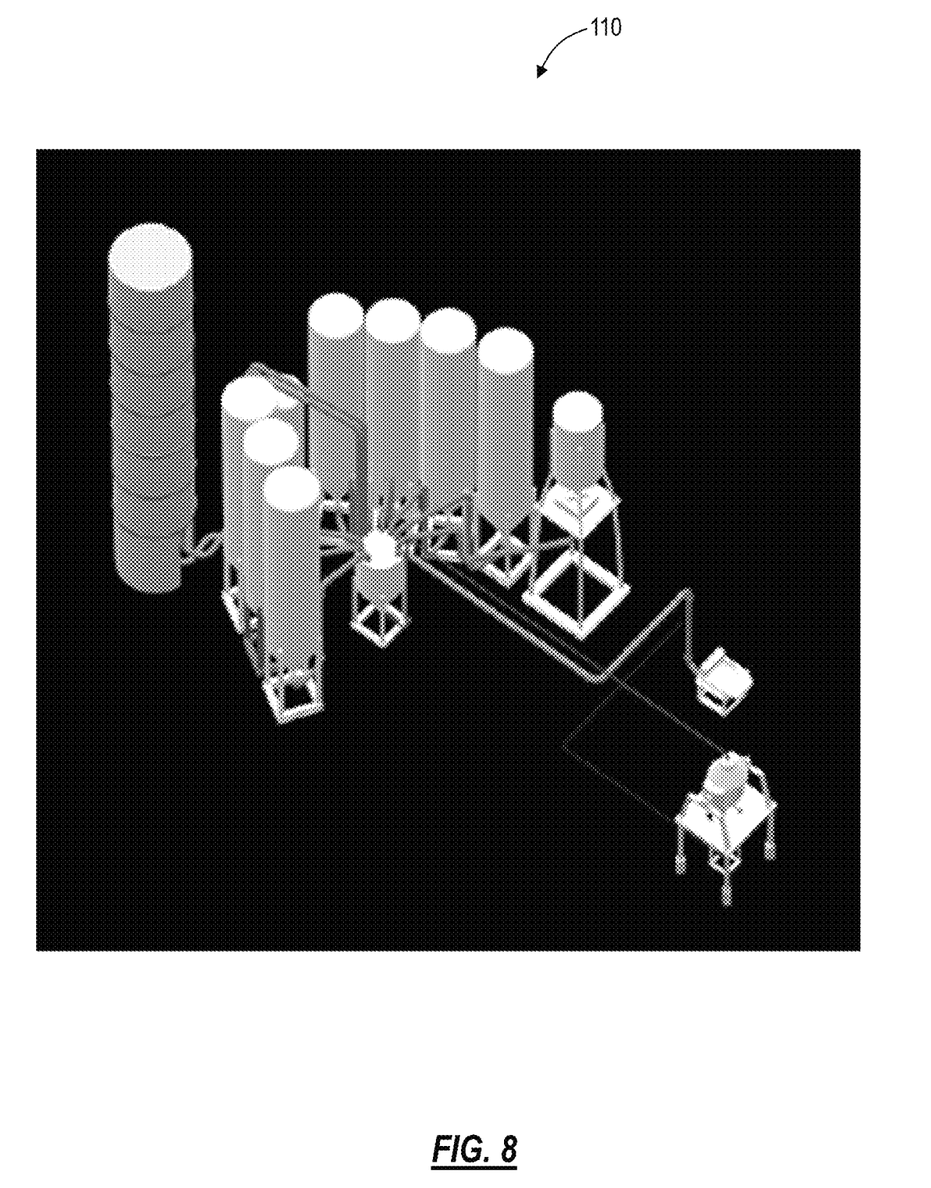
FIG. 8 is an alternative perspective schematic of the oilfield bulk plant of FIG. 7.

FIG. 7 is a perspective schematic of a further embodiment of an oilfield bulk plant 110 of FIG. 2. FIG. 8 is an alternative perspective schematic of the oilfield bulk plant 110 of FIG. 7. Referring now to FIGS. 7 and 8, conversion of the SOH bulk plant to a single tumble blender facility similarly entails removal of all screw conveyors, ISO shipping containers, dilute phase conveyors, and the ribbon mixer. A building sized to house pressure and vacuum compressors, the tumble blender 160, additive station 140, and additives is constructed if not already available. A weigh batcher 150, such as a pneumatic weigh batcher is installed in the area of the existing bulk storage silos 120, and the bulk storage silos 120 are piped to the weigh batcher 150 for dense phase pneumatic conveying. An additive station 140 is installed in the building and piped for pneumatic conveying to the weigh batcher 150. The tumble blender 160 is installed on a work platform, with a vessel capable of pneumatic conveying installed underneath.

At the beginning of the cycle, a vacuum is drawn on the weigh batcher 150. The first layer of bulk materials required from the bulk storage silos 120 is drawn to the weigh batcher 150. The additives are then conveyed to the weigh batcher 150, and then the remainder of the bulk materials required from the bulk storage silos 120 are drawn to the weigh batcher 150. The contents of the weigh batcher 150 are then pneumatically conveyed to the slant cone blender. As the mechanical blending process begins, the weigh batcher 150 can begin charging with materials for the next job. When the blending time is complete, the tumble blender 160 discharges via gravity into the lower vessel. As the lower vessel pressurizes for discharge to a truck or holding tank, the tumble blender 160 is available to receive material from the weigh batcher. The single tumble blender configuration requires less floor space than the dual tumble blender concept, but greater ceiling height.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A bulk storage plant for providing cement mixtures for oil well construction, comprising:
   a plurality of bulk storage sources adapted to contain one or more cement ingredients;
   at least one additive station adapted to provide an additive for adjusting cement properties;
   a weigh batcher connected to the plurality of bulk storage silos and the at least one additive station, the weigh batcher being adapted to receive the one or more cement ingredients from the plurality of bulk storage sources and the additive from the additive station;
   at least one sealable tumble blender connected to the weigh batcher and adapted to receive the one or more cement ingredients and the additive from the weigh batcher;
   one or more couplers adapted to temporarily couple the at least one sealable tumble blender to conduits during ingress of the one or more cement ingredients and the additive and egress of the blended one or more cement ingredients and the additive; and
   a computer control system configured to:
      temporarily couple the one or more couplers with the at least one sealable tumble blender to form a seal with the at least one sealable tumble blender during the ingress of the one or more cement ingredients and the additive;
      seal the at least one sealable tumble blender;
      blend the one or more cement ingredients and the additive while the at least one sealable tumble blender is sealed; and
      provide the blended one or more cement ingredients and the additive to one of a temporary storage silo and a storage vessel for transport to a well site.

2. The bulk storage plant of claim 1, wherein the at least one sealable tumble blender is a slant cone blender.

3. The bulk storage plant of claim 1, wherein the at least one sealable tumble blender is adapted to pneumatically receive the one or more cement ingredients and discharge the blended one or more cement ingredients and the additive.

4. The bulk storage plant of claim 1, further comprising a pneumatic source that is adapted to provide one of a positive pressure and a negative pressure to transport the one or more cement ingredients and the additive between one or more of the plurality of bulk storage sources and the weigh batcher, the at least one additive station and the weigh batcher, the weigh batcher and the at least one sealable tumble blender, and out of the at least one sealable tumble blender.

5. The bulk storage plant of claim 1, wherein the egress of the blended one or more cement ingredients and the additive from the at least one sealable tumble blender is performed by one of pneumatics, mechanical conveyance, and gravitational discharge.

6. The bulk storage plant of claim 1, further comprising:
   at least one lower vessel, each at least one lower vessel positioned underneath a corresponding sealable tumble blender of the at least one sealable tumble blender,
   wherein each of the at least one sealable tumble blender is configured to provide the blended one or more cement ingredients and the additive to a corresponding lower vessel of the at least one lower vessel via gravity discharge, and wherein the at least one lower vessel is configured to provide the blended one or more cement ingredients and the additive to one of the temporary storage silo and the storage vessel for transport to the well site.

7. The bulk storage plant of claim 1, wherein the one or more cement ingredients comprise one or more dry cement ingredients, and the additive comprises a dry additive, and wherein the computer control system is further configured to:
   control infeed of the one more dry cement ingredients and the dry additive to the at least one sealable tumble blender; and
   control outfeed of the blended one more dry cement ingredients and the dry additive to one of the temporary storage silo and the storage vessel.

8. An oil well cementing system, comprising:
   a bulk storage plant including
      a plurality of bulk storage sources adapted to contain one or more cement ingredients,
      at least one additive station adapted to provide an additive for adjusting cement properties,
      a weigh batcher connected to the plurality of bulk storage silos and the at least one additive station, the weigh batcher being adapted to receive the one or more cement ingredients from the plurality of bulk storage sources and the additive from the additive station,
      at least one sealable tumble blender connected to the weigh batcher and adapted to receive the one or more cement ingredients and the additive from the weigh batcher,
      one or more couplers adapted to temporarily couple the at least one sealable tumble blender to conduits during ingress of the one or more cement ingredients and the additive and egress of the blended one or more cement ingredients and the additive,
      a computer control system configured to:
         temporarily couple the one or more couplers with the at least one sealable tumble blender to form a seal with the at least one sealable tumble blender during the ingress of the one or more cement ingredients and the additive, seal the at least one sealable tumble blender, blend the one or more cement ingredients and the additive while the at least one sealable tumble blender is sealed, and provide the blended one or more cement ingredients and the additive to one of a temporary storage silo and a storage vessel for transport to an oil well site, and a cement slurry mixer and pump, the pump configured to move the blended one or more cement ingredients and the additive from one of the temporary storage silo or the storage vessel to the cement slurry mixer.

9. The oil well system of claim 8, wherein the storage vessel is adapted to transfer the blended one or more cement ingredients and the additive blended by the sealable tumble blender from the sealable tumble blender to the cement slurry mixer at the oil well site.

10. The oil well system of claim 8, wherein the temporary storage vessel is adapted to temporarily store the blended one or more cement ingredients and the additive blended by the at least one sealable tumble blender and to provide the blended one or more cement ingredients and the additive to the cement slurry mixer at the oil well site.

11. The oil well system of claim 8, wherein the at least one sealable tumble blender is a slant cone blender.

12. The oil well system of claim 8, wherein the at least one sealable tumble blender is adapted to pneumatically receive the one or more cement ingredients and discharge the blended one or more cement ingredients and the additive.

13. The oil well system of claim 8, wherein the bulk storage plant further includes a pneumatic source that is adapted to provide one of a positive pressure and a negative pressure to transport the one or more cement ingredients and the additive between one or more of the plurality of bulk storage sources and the weigh batcher, the at least one additive station and the weigh batcher, the weigh batcher and the at least one sealable tumble blender, and out of the at least one sealable tumble blender.

14. The oil well system of claim 8, wherein the egress of the blended one or more cement ingredients and the additive from the sealable tumble blender is performed by one of pneumatics, mechanical conveyance, and gravitational discharge.

15. A method for converting an existing oilfield bulk plant, comprising installing a sealable tumble blender at the oilfield bulk plant;

re-routing conduits from each of bulk storage silos adapted to contain one or more cement ingredients and at least one additive station adapted to provide an additive for adjusting cement properties to a weigh batcher adapted to receive the one or more cement ingredients from the plurality of bulk storage sources and the additive from the additive station, the at least one sealable tumble blender connected to the weigh batcher and adapted to receive the one or more cement ingredients and the additive from the weigh batcher;

adding one or more couplers to an end of further conduits, the one or more couplers adapted to temporarily connect to and form a seal with the at least one sealable tumble blender during ingress of the one or more cement ingredients and the additive and egress of the blended one or more cement ingredients and the additive; and adding a computer control system at the oilfield bulk plant, the computer control system configured to:

temporarily couple the one or more couplers with the at least one sealable tumble blender to form a seal with the at least one sealable tumble blender during the ingress of the one or more cement ingredients and the additive, seal the at least one sealable tumble blender in response to receiving the materials, blend the one or more cement ingredients and the additive while the at least one sealable tumble blender is sealed, and provide the blended one or more cement ingredients and the additive to one of a temporary storage silo and a storage vessel for transport to a well site.

16. The method of claim 15, further comprising:

converting a pneumatic blender into the temporary storage silo, wherein the further conduits comprise re-routed conduits from the temporary storage silo to the sealable tumble blender.

17. The method of claim 15, wherein a single coupler of the one or more couplers is used to couple all of the further conduits for ingress of the material to the sealable tumbler blender and egress of the blended materials from the sealable tumble blender.

* * * * *